(12) United States Patent
Asa

(10) Patent No.: US 10,625,788 B2
(45) Date of Patent: Apr. 21, 2020

(54) VEHICLE SIDE SECTION STRUCTURE

(71) Applicant: TOYOTA JIDOSHA KABUSHIKI KAISHA, Toyota-shi, Aichi-ken (JP)

(72) Inventor: Ryosuke Asa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/046,335

(22) Filed: Jul. 26, 2018

(65) Prior Publication Data
US 2019/0047636 A1 Feb. 14, 2019

(30) Foreign Application Priority Data
Aug. 10, 2017 (JP) .................................. 2017-156034

(51) Int. Cl.
- *B62D 25/04* (2006.01)
- *B62D 27/02* (2006.01)
- *B62D 25/02* (2006.01)

(52) U.S. Cl.
CPC ........... *B62D 25/04* (2013.01); *B62D 25/025* (2013.01); *B62D 27/02* (2013.01); *B62D 27/023* (2013.01)

(58) Field of Classification Search
CPC ............................. B62D 25/04; B62D 25/025
USPC ............................. 296/187.12, 193.06, 209
See application file for complete search history.

(56) References Cited

U.S. PATENT DOCUMENTS

| 9,150,258 B1* | 10/2015 | May ...................... B62D 27/023 |
| 2006/0237996 A1 | 10/2006 | Eipper et al. |
| 2016/0288841 A1* | 10/2016 | Nakanishi .............. B62D 25/04 |
| 2019/0002027 A1* | 1/2019 | Park ...................... B62D 25/025 |
| 2019/0031242 A1* | 1/2019 | Takii ...................... B62D 25/02 |
| 2019/0047629 A1* | 2/2019 | Asa ........................ B62D 27/023 |
| 2019/0152529 A1* | 5/2019 | Otoguro ............... B62D 21/152 |

FOREIGN PATENT DOCUMENTS

JP 2005-537179 A 12/2005

* cited by examiner

*Primary Examiner* — Jason S Morrow
(74) *Attorney, Agent, or Firm* — Oliff PLC (57) ABSTRACT

A vehicle side section structure includes a framework member with a closed cross-section structure that is provided at a vehicle width direction outer end of a vehicle body and that extends along a vehicle front-rear direction so as to configure vehicle framework; and a pillar that extends in a vehicle vertical direction, at least one of an upper end or a lower end of the pillar being joined to the framework member; and a joining structure including a provisional holding member and a fastening member with greater joining strength than the provisional holding member, the joining structure mechanically joining the framework member and the pillar.

5 Claims, 5 Drawing Sheets

VEHICLE SIDE SECTION STRUCTURE

CROSS-REFERENCE TO RELATED APPLICATION

This application is based on and claims priority under 35 USC 119 from Japanese Patent Application No. 2017-156034 filed on Aug. 10, 2017, the disclosure of which is incorporated by reference herein.

BACKGROUND

Technical Field

The present disclosure relates to a vehicle side section structure.

Related Art

Japanese National-Phase Publication No. 2005-537179 discloses a vehicle made up of a base module that includes a floor panel, a roof module, a front-end module, and a rear-section module. In Japanese National-Phase Publication No. 2005-537179, a B column (center pillar) is adhered (joined) to the base module and the roof module.

In cases in which the pillar is formed from a high-tensile material (e.g., high tensile strength steel plate) so as to reduce weight, the pillar may recoil due to springback after being press-formed. It may not be possible to secure sufficient contact area between the pillar and a framework member in such cases, and depending on the method by which the pillar is joined it may be difficult for a join state of the pillar to be well-maintained.

SUMMARY

In consideration of the above circumstances, the present disclosure provides a vehicle side section structure that enables a join state of a pillar to be well-maintained regardless of the pillar material.

An aspect of the present disclosure is a vehicle side section structure including a framework member with a closed cross-section structure that is provided at a vehicle width direction outer end of a vehicle body and that extends along a vehicle front-rear direction so as to configure vehicle framework; and a pillar that extends in a vehicle vertical direction, at least one of an upper end or a lower end of the pillar being joined to the framework member; and a joining structure including a provisional holding member and a fastening member with greater joining strength than the provisional holding member, the joining structure mechanically joining the framework member and the pillar.

In the vehicle side section structure according to the aspect, the framework member configuring vehicle framework is provided at the vehicle width direction outer end of the vehicle body, and the framework member extends along the vehicle front-rear direction. At least one of the upper end or the lower end of the pillar is joined to the framework member. The pillar is mechanically joined to the framework member by the provisional holding member and the fastening member, which has greater joining strength than the provisional holding member. Mechanically joining the pillar and the framework member together in this manner enables the pillar to be joined to the framework member while being pressed thereagainst, enabling the pillar to be securely joined to the framework member even when the pillar recoils due to springback or the like.

The vehicle side section structure according to the present aspect thus enables a join state of the pillar to be well-maintained regardless of the pillar material.

In the aspect, the provisional holding member may be a blind rivet, and the fastening member may be a bolt and a nut.

Employing a blind rivet as the provisional holding member in this configuration, enables provisional holding to be performed from a single side. In addition, employing a bolt and a nut as the fastening member enables a join state of the pillar to be well-maintained using a simple structure.

This configuration thus enables a join state of the pillar to be well-maintained while also improving the efficiency of a provisional holding operation.

In the aspect, configuration may be such that the framework member includes: rocker including, at an upper end, a door opening flange that extends in the vehicle vertical direction so as to configure a lower edge of a door opening, a vehicle width direction outer side wall, and a vehicle width direction inner side wall; and a bracket that is attached to the vehicle width direction inner side wall of the rocker and that extends toward the vehicle upper side, and the pillar includes a pillar outer panel and a pillar inner panel that is positioned at the vehicle width direction inner side of the pillar outer panel, the pillar outer panel being joined to the vehicle width direction outer side wall of the rocker, the pillar inner panel being joined to the bracket, and a position where the pillar inner panel and the bracket are joined is set at the vehicle upper side of the door opening flange.

In this configuration, the pillar outer panel is joined to the vehicle width direction outer side wall of the rocker. The bracket is attached to the vehicle width direction inner side wall of the rocker, and the bracket extends toward the vehicle upper side from the rocker. The pillar inner panel is joined to the bracket. The door opening flange that forms the lower edge of the door opening is provided at the upper end of the rocker. The position where the pillar inner panel and the bracket are joined is set at the vehicle upper side of the door opening flange. Interference between the fastening member and the door opening flange is thus able to be suppressed.

This configuration thus enables interference between the fastening member and the door opening flange to be suppressed.

In the aspect, configuration may be such that the pillar outer panel and the pillar inner panel are configured to accommodate a webbing take-up device therebetween such that a vehicle width direction inner side of the take-up device is covered by the pillar inner panel.

Covering the vehicle width direction inner side of the take-up device with the pillar inner panel in this configuration enables the rigidity of the pillar to be improved compared to structures formed with an installation hole in a pillar inner panel at a position corresponding to a take-up device. Since the pillar of the present disclosure is mechanically joined to the framework member, the pillar does not need to be installed when the other components are welded in a welding process. This allows the pillar in which the take-up device is disposed between the pillar outer panel and the pillar inner panel to be assembled to the framework member, with the result that an installation hole for installing the take-up device at a later stage need not be formed in the pillar inner panel.

This configuration thus enables the rigidity of the pillar to be improved.

BRIEF DESCRIPTION OF THE DRAWINGS

An exemplary embodiment of the present disclosure will be described in detail based on the following figures, wherein.

DETAILED DESCRIPTION

Explanation follows regarding a vehicle side section structure according to an exemplary embodiment, with reference to the drawings. Note that the arrow FR, the arrow UP, and the arrow OUT in each of the drawings respectively indicate a direction toward the vehicle front, a direction toward the vehicle upper side, and a direction toward the vehicle width direction outer side. In the following explanation, unless specifically stated otherwise, reference simply to the front and rear, upward and downward, and left and right directions refers to the front and rear in a vehicle front-rear direction, upward and downward in a vehicle vertical direction, and left and right in the vehicle width direction when oriented in a direction of travel.

Overall Configuration of Vehicle Side Section

Figure 1:
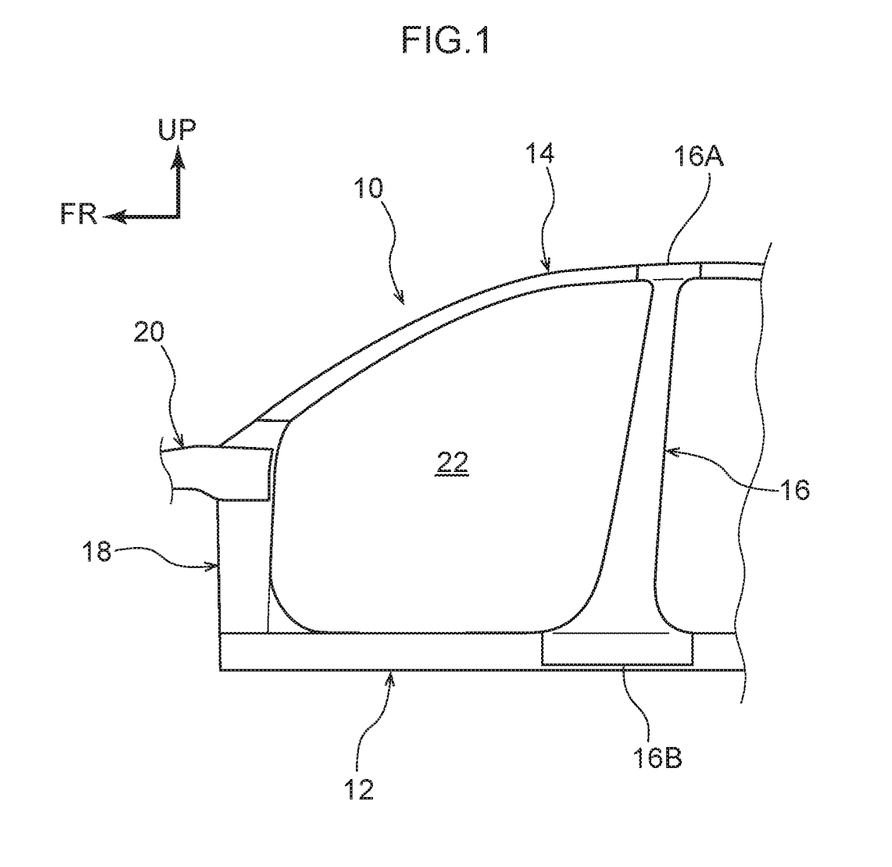
FIG. 1 is a side view illustrating a side section of a vehicle to which a vehicle side section structure according to an exemplary embodiment has been applied.

As illustrated in FIG. 1, a vehicle side section structure according to the exemplary embodiment principally includes a roof rail 14 serving as a framework member, a rocker 12 serving as a framework member, and a center pillar 16.

The roof rail 14 is provided to a vehicle upper portion of a vehicle width direction outer end of a vehicle body 10, and extends in the vehicle front-rear direction. The roof rail 14 has a closed cross-section structure, and configures vehicle framework. A left-right pair of the roof rails 14 are provided at respective vehicle width direction ends of the vehicle body 10. Note that as the pair of roof rails 14 are structured with left-right symmetry to each other, only the roof rail 14 on the vehicle left side is illustrated and described in the following explanation.

The rocker 12 is provided to a vehicle lower portion of a vehicle width direction outer end of the vehicle body 10 and extends in the vehicle front-rear direction so as to configure vehicle framework. In the exemplary embodiment, for example, the rocker 12 has a closed cross-section structure formed by extruding a lightweight metal such as an aluminum alloy. A left-right pair of the rockers 12 are provided at respective vehicle width direction ends of the vehicle body 10. Note that as the pair of rockers 12 are structured with left-right symmetry, only the rocker 12 on the vehicle left side is illustrated and described in the following explanation.

A front pillar 18 couples a front end of the rocker 12 to a front end of the roof rail 14. The front pillar 18 is a member with a closed cross-section structure extending in the vehicle vertical direction. An upper end of the front pillar 18 is joined to the front end of the roof rail 14. A lower end of the front pillar 18 is joined to the front end of the rocker 12. A rear end of a front side member 20 extending in the vehicle front-rear direction is joined to the front pillar 18.

The center pillar 16 is provided to the vehicle rear side of the front pillar 18. The center pillar 16 extends in the vehicle vertical direction. An upper end 16A of the center pillar 16 is joined to the roof rail 14, and a lower end 16B of the center pillar 16 is joined to the rocker 12. The structure of the center pillar 16 will be described in detail below.

A door opening 22 is configured by the region bounded by the roof rail 14, the rocker 12, the front pillar 18, and the center pillar 16 described above. An upper edge of the door opening 22 is thus configured by the roof rail 14, and a lower edge of the door opening 22 is configured by the rocker 12. In addition, a front edge of the door opening 22 is configured by the front pillar 18, and a rear edge of the door opening 22 is configured by the center pillar 16. The door opening 22 is closed off by a non-illustrated front side door.

Join Between Center Pillar and Roof Rail

Figure 2:
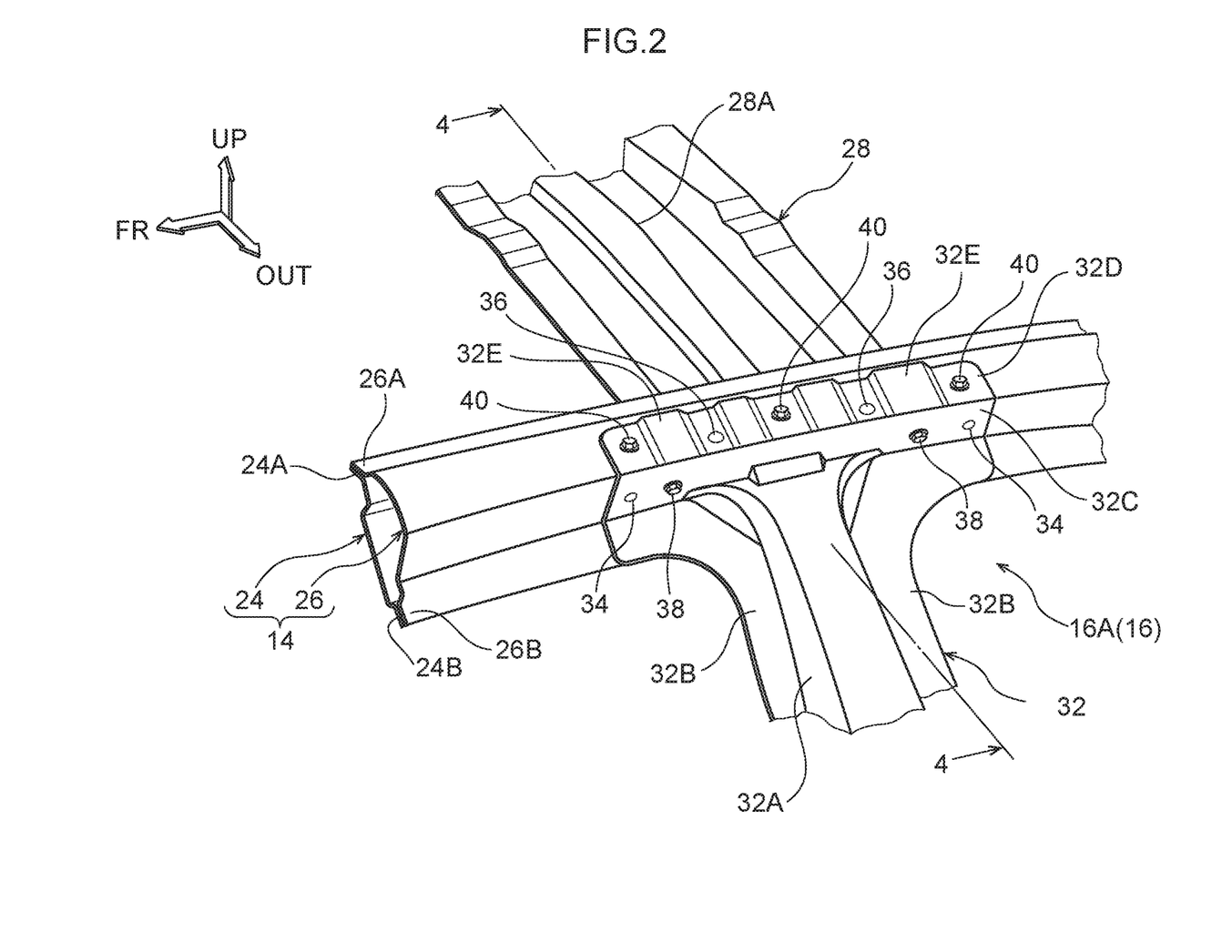
FIG. 2 is an enlarged perspective view illustrating a join portion between the center pillar and the roof rail in FIG. 1.

Detailed explanation follows regarding a join between the upper end 16A of the center pillar 16 and the roof rail 14. As illustrated in FIG. 2, the roof rail 14 includes a roof rail outer panel 26 and a roof rail inner panel 24. The roof rail outer panel 26 is positioned on the vehicle width direction outer side of the roof rail 14, and the roof rail inner panel 24 is positioned on the vehicle width direction inner side of the roof rail 14. The roof rail outer panel 26 is formed with a substantially hat-shaped profile (cross-section) that opens toward the vehicle width direction inner side. An outer upper flange 26A extends toward the vehicle width direction inner side from the upper end of the roof rail outer panel 26. An outer lower flange 26B also extends toward the vehicle lower side and vehicle width direction outer side from the lower end of the roof rail outer panel 26.

The roof rail inner panel 24 is formed with a substantially hat-shaped profile (cross-section) that opens toward the vehicle width direction outer side. An inner upper flange 24A extends toward the vehicle width direction inner side from the upper end of the roof rail inner panel 24. An inner lower flange 24B also extends toward the vehicle lower side and vehicle width direction outer side from the lower end of the roof rail inner panel 24. The outer upper flange 26A and the inner upper flange 24A are welded together in an overlapped state, and the outer lower flange 26B and the inner lower flange 24B are welded together in an overlapped state. The closed cross-section structure of the roof rail 14 is thus formed.

A roof reinforcement 28 is connected to the roof rail inner panel 24. The roof reinforcement 28 extends along the vehicle width direction spanning between the left and right roof rails 14. A vehicle front-rear direction central portion of the roof reinforcement 28 is recessed downward. In this recess, a raised bead 28A is formed extending along the vehicle width direction.

Figure 4:
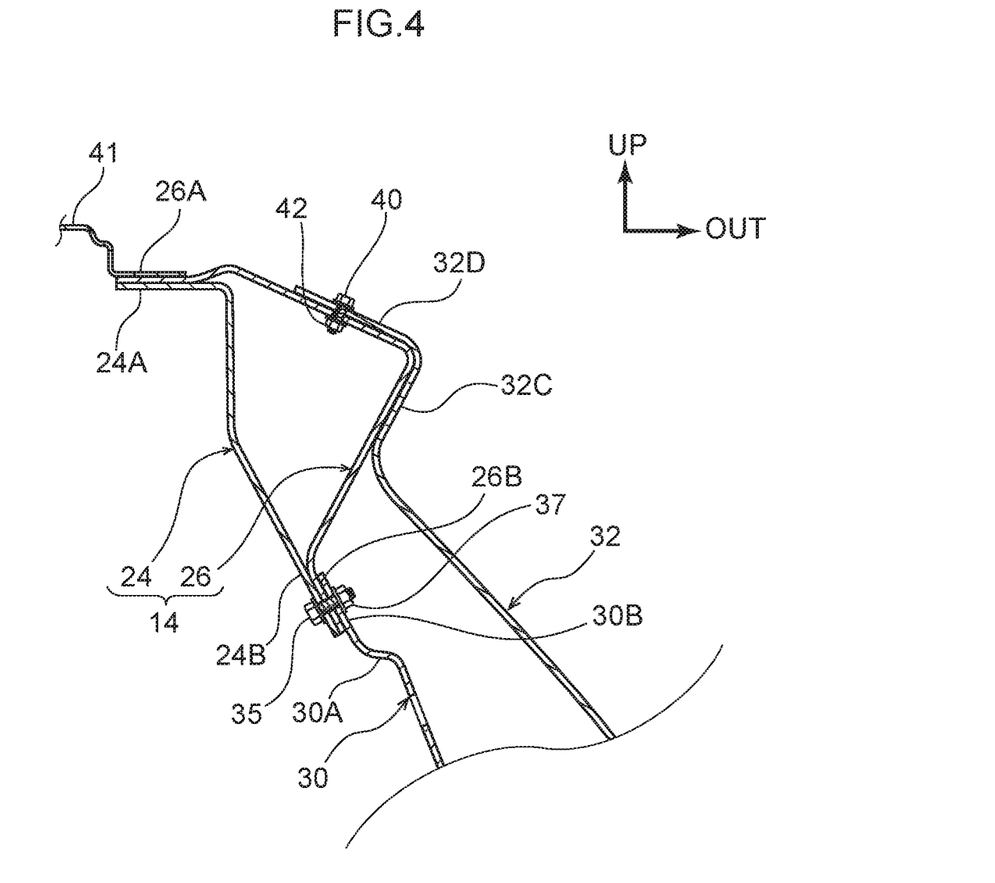
FIG. 4 is a cross-section illustrating a state sectioned along line 4-4 in FIG. 2.

As illustrated in FIG. 2 and FIG. 4, the center pillar 16 includes a pillar outer panel 32 and a pillar inner panel 30. The pillar outer panel 32 configures a vehicle outer side of the center pillar 16 and the pillar inner panel 30 configures a vehicle inner side of the center pillar 16, thereby configuring the center pillar 16 with a closed cross-section structure. The pillar outer panel 32 includes a main pillar portion 32A and flanges 32B. The main pillar portion 32A has a substantially C-shaped profile (cross-section) that is open at the vehicle width direction inner side as viewed in horizontal cross-section. The flanges 32B extend toward the front and rear from the main pillar portion 32A, thereby forming the pillar outer panel 32 with a substantially hat-shaped profile (cross-section) overall.

An upper end of each flange 32B is widened in the vehicle front-rear direction so as to run along the outer lower flange 26B of the roof rail outer panel 26. The upper ends of the flanges 32B are overlapped onto the outer lower flange 26B.

A first join face 32C extends toward the vehicle upper side and vehicle width direction outer side from the upper ends of the flanges 32B so as to run along the roof rail outer panel 26. The first join face 32C is overlapped onto the roof rail outer panel 26 and provisionally held in place using blind rivets 34, these being provisional holding members. The first join face 32C and the roof rail outer panel 26 are further mechanically joined (fastened) together by bolts 38 and weld nuts (not illustrated in the drawings), these being fastening members with greater joining strength than the blind rivets 34. The blind rivets 34 and the bolts 38 are referred to as a joining structure, as a whole.

In detail, both vehicle front-rear direction ends of the first join face 32C are provisionally held in place by the blind rivets 34. The blind rivets 34 are inserted from the vehicle outer side of the first join face 32C and then crimped or swaged at the back face side of the roof rail outer panel 26 (i.e., inside the closed cross-section). A non-illustrated weld nut is attached to the back face side of the roof rail outer panel 26 at a position spaced further toward the vehicle rear than the blind rivet 34 on the front side of the roof rail outer panel 26. A bolt 38 is screwed in from the vehicle outer side of the first join face 32C and engaged with this weld nut. Similarly, another non-illustrated weld nut is attached to the back face side of the roof rail outer panel 26 at a position spaced further toward the vehicle front than the blind rivet 34 on the rear side of the roof rail outer panel 26. Another bolt 38 is screwed in from the vehicle outer side of the first join face 32C and engaged with this weld nut. Namely, in the exemplary embodiment, the first join face 32C and the roof rail outer panel 26 are fastened together at two locations by the bolts 38 and weld nuts. Note that in the following explanation, similarly, fastening using bolts and weld nuts provides a higher strength join than when using blind rivets.

A second join face 32D of the pillar outer panel 32 extends toward the vehicle upper side and vehicle width direction inner side from the upper end of the first join face 32C so as to run along the roof rail outer panel 26. The second join face 32D is overlapped onto the roof rail outer panel 26 and provisionally held in place using blind rivets 36, these being provisional holding members. The second join face 32D and the roof rail outer panel 26 are further mechanically joined (fastened) together by bolts 40 and weld nuts 42, these being fastening members. The blind rivets 36, the bolts 40 and the weld nuts 42 are referred to as the joining structure, as a whole.

In detail, four raised beads 32E are formed on the second join face 32D spaced apart in the vehicle front-rear direction. The location between the first raised bead 32E from the front and the second raised bead 32E from the front is provisionally held in place by a blind rivet 36. This blind rivet 36 is inserted from the vehicle outer side of the second join face 32D and then crimped or swaged at the back face side of the roof rail outer panel 26 (in the closed cross-section). The location between the third raised bead 32E from the front and the fourth raised bead 32E from the front is similarly provisionally held in place by a blind rivet 36.

Weld nuts 42 are attached to the back face side of the roof rail outer panel 26 at three locations: both vehicle front-rear direction ends and the central portion of the second join face 32D (only the weld nut 42 at the vehicle front-rear direction central portion is illustrated in FIG. 4). Bolts 40 are screwed in from the vehicle outer side of the second join face 32D and engaged with the weld nuts 42. In the exemplary embodiment, the second join face 32D and the roof rail outer panel 26 are thereby fastened together at three locations by the bolts 40 and the weld nuts 42.

The pillar inner panel 30 is provided at the vehicle width direction inner side of the pillar outer panel 32. The pillar inner panel 30 is formed with a substantially hat-shaped profile (cross-section) that opens toward the vehicle width direction outer side. Non-illustrated flanges provided at both vehicle front-rear direction ends of the pillar inner panel 30 are overlapped with and welded to the flanges 32B of the pillar outer panel 32.

A stepped portion 30A is provided at an upper portion of the pillar inner panel 30. A flange 30B is configured at an upper end of the pillar inner panel 30 by the stepped portion 30A. The flange 30B is positioned at the vehicle width direction inner side of the main portion of the pillar inner panel 30. The flange 30B is overlapped onto the outer lower flange 26B of the roof rail outer panel 26, and the flange 30B is mechanically joined (fastened) thereto by bolts 35 and weld nuts 37. The bolts 35 and the weld nuts 37 are referred to as the joining structure, as a whole.

In detail, the weld nuts 37 are attached to the back face side of the flange 30B of the pillar inner panel 30 (i.e., inside the closed cross-section), and the bolts 35 are screwed in from the vehicle width direction inner side of the roof rail inner panel 24 and engaged with the weld nuts 37. The flange 30B of the pillar inner panel 30, the outer lower flange 26B of the roof rail outer panel 26, and the inner lower flange 24B of the roof rail inner panel 24, a total of three sheets, are thus fastened together by the bolts 35 and the weld nuts 37.

Note that the pillar inner panel 30 is fastened to the roof rail 14 at three locations, similarly to the second join face 32D of the pillar outer panel 32. Further, two locations between fastening portions are provisionally held in place using non-illustrated blind rivets. The upper end 16A of the center pillar 16 is thereby joined to the roof rail 14.

Join Between Center Pillar and Rocker

Figure 5:
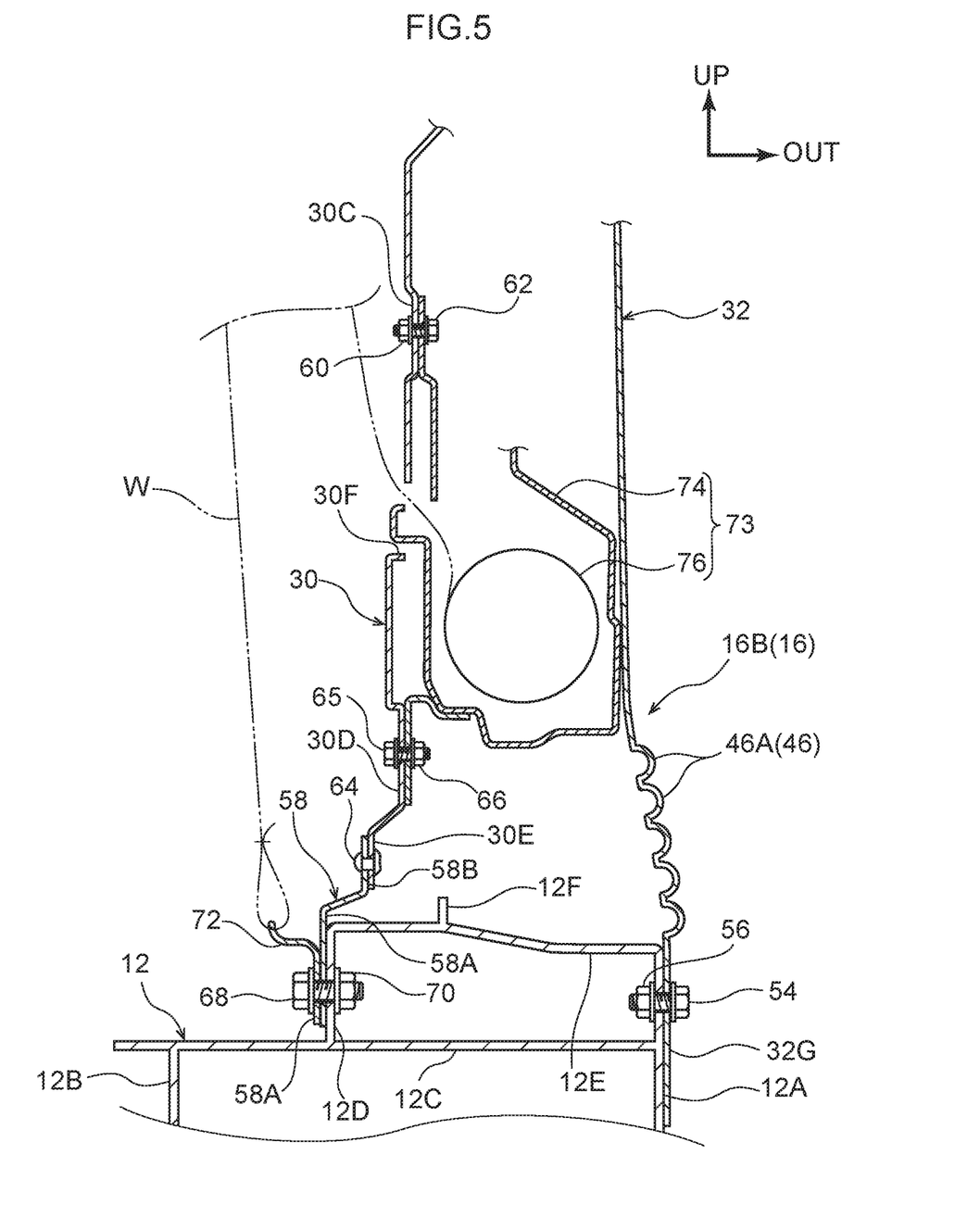
FIG. 5 is a cross-section illustrating a state sectioned along line 5-5 in FIG. 3.

Detailed explanation follows regarding the join between the lower end 16B of the center pillar 16 and the rocker 12. As illustrated in FIG. 5, the rocker 12 includes an outer upright wall 12A and a first inner upright wall 12B that are provided spaced apart in the vehicle width direction, and a partitioning wall 12C that couples the outer upright wall 12A to the first inner upright wall 12B in the vehicle width direction. A non-illustrated lower wall couples lower ends of the outer upright wall 12A and the first inner upright wall 12B together in the vehicle width direction. A closed cross-section is thus formed by the outer upright wall 12A, the first inner upright wall 12B, the partitioning wall 12C, and the lower wall.

A second inner upright wall 12D extends toward the vehicle upper side from a location on the partitioning wall 12C between the outer upright wall 12A and the first inner upright wall 12B. The outer upright wall 12A extends to the vehicle upper side of the partitioning wall 12C. An upper wall 12E couples upper ends of the second inner upright wall 12D and the outer upright wall 12A together in the vehicle width direction. A closed cross-section is thus formed by the outer upright wall 12A, the second inner upright wall 12D, the partitioning wall 12C, and the upper wall 12E.

A door opening flange 12F extends toward the vehicle upper side from the upper wall 12E. The door opening flange 12F configures the lower edge of the door opening 22. Non-illustrated door sealing is attached to a vehicle width direction outer side face of the door opening flange 12F.

Figure 3:
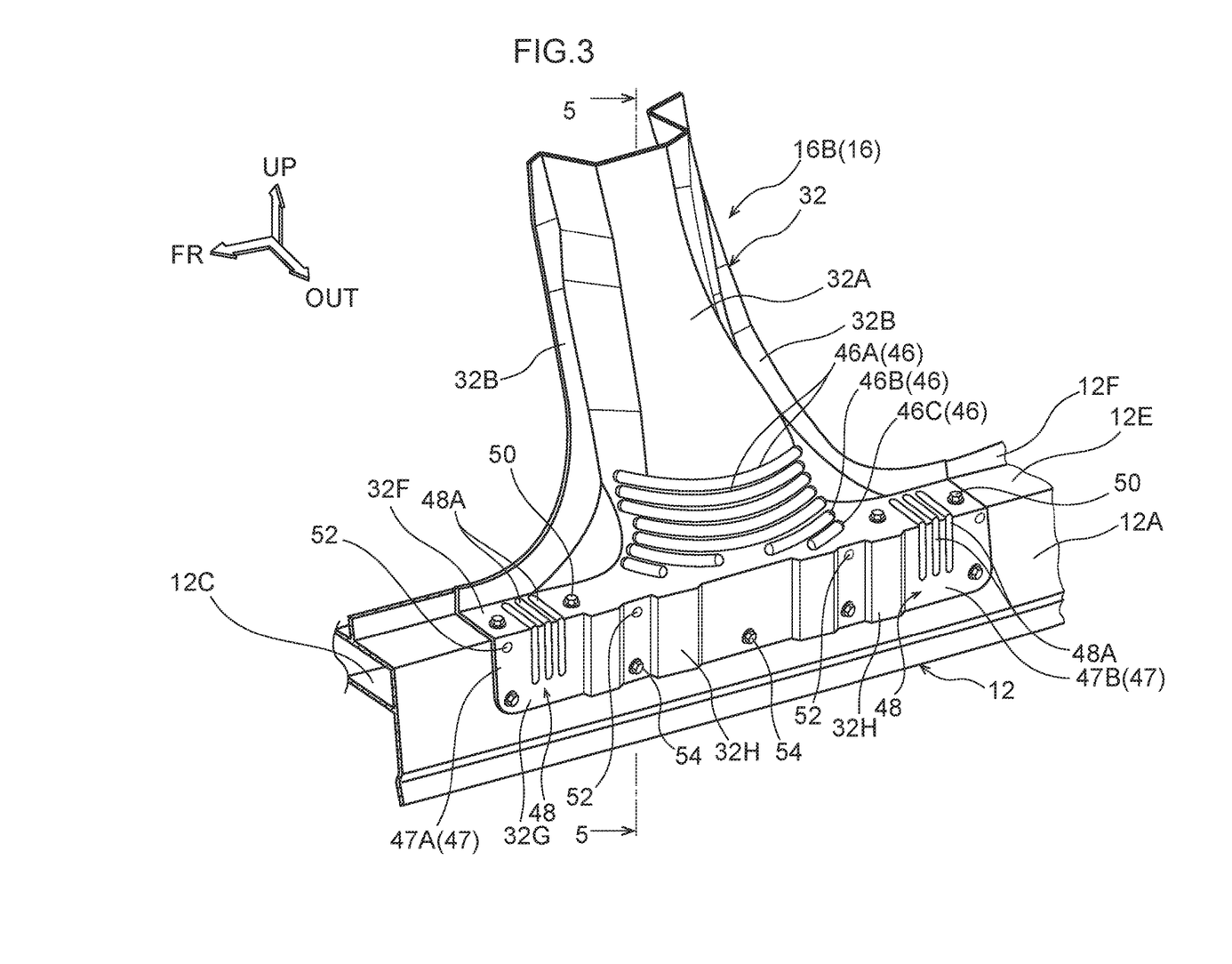
FIG. 3 is an enlarged perspective view illustrating a join portion between the center pillar and the rocker in FIG. 1.

As illustrated in FIG. 3, the lower end of each flange 32B of the center pillar 16 is widened in the vehicle front-rear direction so as to run along the door opening flange 12F of the rocker 12. The lower ends of the flanges 32B are overlapped onto the door opening flange 12F.

A third join face 32F extends toward the vehicle width direction outer side from the lower end of the flanges 32B so as to run along the upper wall 12E of the rocker 12. The third join face 32F is overlapped onto the upper wall 12E, and is mechanically joined (fastened) thereto by bolts 50 and weld nuts (not illustrated in the drawings). The bolts 50 are referred to as the joining structure, as a whole.

In detail, the non-illustrated weld nuts are respectively attached to the back face side of the upper wall 12E of the rocker 12 (in the closed cross-section) at two locations respectively corresponding to the vehicle front-rear direction ends of the third join face 32F. The bolts 50 are screwed in from the vehicle outer side of the third join face 32F and engaged with the weld nuts. In the exemplary embodiment, the third join face 32F is thereby fastened to the upper wall 12E of the rocker 12 at four locations by the bolts 50 and the weld nuts.

As illustrated in FIG. 3 and FIG. 5, a fourth join face 32G of the pillar outer panel 32 extends toward the vehicle lower side from the vehicle width direction outer end of the third join face 32F so as to run along the outer upright wall 12A of the rocker 12. The fourth join face 32G is overlapped with the outer upright wall 12A and is provisionally held in place using blind rivets 52, these being provisional holding members. The fourth join face 32G and the outer upright wall 12A are mechanically joined (fastened) together by bolts 54 and weld nuts 56, these being fastening members. The blind rivets 52, the bolts 54 and the weld nuts 56 are referred to as the joining structure, as a whole.

In detail, four raised beads 32H are formed on the fourth join face 32G spaced apart in the vehicle front-rear direction. The location between the first raised bead 32H from the front and the second raised bead 32H from the front, and the location between the third raised bead 32H from the front and the fourth raised bead 32H from the front are provisionally held in place by the blind rivets 52. The blind rivets 52 are inserted from the vehicle outer side of the fourth join face 32G and then crimped or swaged at the back face side of the outer upright wall 12A (in the closed cross-section). Both vehicle front-rear direction ends of the fourth join face 32G are similarly provisionally held in place by the blind rivets 52.

The weld nuts 56 are attached to the back face side of the outer upright wall 12A corresponding to positions on the vehicle lower side of the respective blind rivets 52. The bolts 54 are screwed in from the vehicle outer side of the fourth join face 32G and engaged with the weld nuts 56. The vehicle front-rear direction central portion of the fourth join face 32G is similarly fastened to the outer upright wall 12A by the weld nuts 56 and the bolts 54. In the exemplary embodiment, the fourth join face 32G is thereby fastened to the outer upright wall 12A of the rocker 12 at five locations by the bolts 54 and the weld nuts 56.

A lower end 30E of the pillar inner panel 30 is joined to the rocker 12 via a bracket 58. In detail, the bracket 58 is attached to the vehicle width direction inner side face of the second inner upright wall 12D of the rocker 12. The bracket 58 extends toward the vehicle upper side from the rocker 12, and is formed in substantially a crank shape having a lower end 58A positioned to the vehicle width direction inner side of an upper end 58B as viewed from the front side of the vehicle. The lower end 58A of the bracket 58 is overlapped onto the second inner upright wall 12D of the rocker 12, and is fastened thereto by an anchor member 72, described below, and by bolts 68 and weld nuts 70.

The upper end 58B of the bracket 58 is overlapped with the lower end 30E of the pillar inner panel 30 and is provisionally held in place by a blind rivet 64. The upper end 58B of the bracket 58 and the lower end 30E of the pillar inner panel 30 are mechanically joined (fastened) together by bolts (not illustrated in the drawings) and weld nuts (not illustrated in the drawings) at positions spaced to the vehicle front side and the vehicle rear side of the blind rivet 64. The blind rivet 64 is referred to as the joining structure.

The position where the upper end 58B of the bracket 58 and the lower end 30E of the pillar inner panel 30 are joined is thereby set at the vehicle upper side of the door opening flange 12F formed to the rocker 12.

Center Pillar Lower Portion Structure

Explanation follows regarding a lower portion structure of the center pillar 16. As illustrated in FIG. 3, a pleated section 46, in which ridges and valleys are alternatingly formed in the vehicle vertical direction, is provided at the lower end of the center pillar 16. The pleated section 46 is provided at the vehicle upper side of the third join face 32F, this being a join between the center pillar 16 and the rocker 12.

The pleated section 46 includes five first protrusions 46A, two second protrusions 46B, and two third protrusions 46C arranged alongside each other in the vehicle vertical direction. Each of the five first protrusions 46A has its length direction in the vehicle front-rear direction and has an arcuate profile, and is formed from a front end to a rear end of the pillar outer panel 32.

As illustrated in FIG. 5, the location where the first protrusions 46A are formed on the pillar outer panel 32 is inclined toward the vehicle width direction outer side on progression from the vehicle upper side toward the vehicle lower side. This location has a wave-shaped profile as viewed from the front side of the vehicle. The first protrusions 46A are formed at the vehicle upper side of the fourth join face 32G and at the vehicle lower side of a retractor 73, this being a webbing W take-up device, described below.

As illustrated in FIG. 3, the second protrusions 46B are formed at the vehicle lower side of the first protrusions 46A. The second protrusions 46B are formed with shorter vehicle front-rear direction lengths than the first protrusions 46A. The second protrusions 46B are formed below the front side and below the rear side of the fifth first protrusion 46A from the top. The third protrusions 46C are formed below respective second protrusions 46B. The third protrusions 46C have shorter vehicle front-rear direction lengths than the second protrusions 46B, and are respectively formed at the front end side of the front second protrusion 46B and the rear end side of the rear second protrusion 46B.

Front and rear pleated sections 48, in which ridges and valleys are alternatingly formed in the vehicle front-rear direction, are provided to the third join face 32F and the fourth join face 32G. In detail, the front and rear pleated sections 48 are provided at widened portions 47 of the third join face 32F and the fourth join face 32G that are widened toward the vehicle front-rear direction outer sides of the pleated section 46. In the exemplary embodiment, the front and rear pleated sections 48 are respectively provided at a widened portion 47A on the front side of the pleated section 46 and a widened portion 47B on the rear side of the pleated section 46.

The front and rear pleated sections 48 each include three fourth protrusions 48A arranged alongside each other in the vehicle front-rear direction. Each of the fourth protrusions 48A extends in the vehicle width direction from an inner end to an outer end of the third join face 32F, and continues from the outer end of the third join face 32F so as to extend toward the lower side of the vehicle as far as a lower end of the fourth join face 32G. The fourth protrusions 48A are thus formed in substantially an L-shape.

As illustrated in FIG. 5, the retractor 73 that takes up the webbing W is provided within the center pillar 16. The retractor 73 is retained at the vehicle upper side of the pleated section 46 in a state sandwiched between the pillar outer panel 32 and the pillar inner panel 30, and includes a case 74 configuring an outer casing therefor. The case 74 is formed in a substantially box shape that is open toward the vehicle upper side. A lower end of the case 74 is fastened to a lower fastening portion 30D of the pillar inner panel 30 by bolts 65 and weld nuts 66. An upper end of the case 74 is fastened to an upper fastening portion 30C of the pillar inner panel 30 by bolts 60 and weld nuts 62.

A spool 76 is housed in the case 74. One end of the webbing W is wrapped onto the spool 76. The other end of the webbing W leads out into the vehicle cabin through an opening 30F formed in the pillar inner panel 30. The webbing W leading out into the vehicle cabin is entrained around a non-illustrated belt guide or the like provided at the upper side of the vehicle cabin, and the other end of the webbing W is fixed to the anchor member 72 fastened to the rocker 12. Note that the vehicle width direction inner side of the retractor 73 is covered by the pillar inner panel 30 except for at the opening 30F. Herein, "covered" is not limited to meaning a structure in which the vehicle width direction inner side of the retractor 73 is completely covered by the pillar inner panel 30, and more generally encompasses structures formed with an opening, such as an opening for pulling out the webbing W, of a size through which the retractor 73 may not be installed afterwards.

Operation and Effects

Explanation follows regarding the operation and effects of the exemplary embodiment.

As illustrated in FIG. 2 and FIG. 4, in the vehicle side section structure according to the exemplary embodiment, the roof rail 14 and the center pillar 16 are provisionally held in place using the blind rivets 34, 36 and then further mechanically joined together by the bolts 35, 38, 40, and the weld nuts 37, 42. As illustrated in FIG. 3 and FIG. 5, the rocker 12 and the center pillar 16 are also provisionally held in place using the blind rivets 52 and then further mechanically joined by the bolts 50, 54 and the weld nuts 56. This allows the center pillar 16 to be joined to the roof rail 14 and the rocker 12 while being pressed thereagainst, enabling the center pillar 16 to be securely joined to the roof rail 14 and the rocker 12 even when the center pillar 16 recoils due to springback or the like.

In particular, in cases in which the center pillar 16 is formed from a high-tensile material (high tensile strength steel plate) so as to reduce weight, the center pillar 16 may recoil greatly due to springback after being press-formed. If welding is employed in such cases, it may not be possible to secure sufficient contact area between the center pillar 16 and the roof rail 14, and welding defects may arise. However, mechanically joining the center pillar 16 and the roof rail 14 enables these to be reliably joined as the center pillar 16 is pressed against the roof rail 14, and enables a join state of the center pillar 16 to be well-maintained regardless of the material of the center pillar 16. As for the join between the center pillar 16 and the rocker 12, similarly, mechanically joining the center pillar 16 and the rocker 12 together enables a join state of the center pillar 16 to be well-maintained regardless of the material of the center pillar 16.

Since the exemplary embodiment has a structure in which the center pillar 16 is mechanically joined to the roof rail 14 and the rocker 12, the center pillar 16 does not need to be installed when the other components are welded in a welding process. This allows the center pillar 16 to be installed at a later stage, such that the center pillar 16 does not get in the way during the installation of components such as seating in the vehicle cabin. Namely, the efficiency of operations when assembling components in the vehicle cabin may be improved.

Moreover, in the exemplary embodiment, since blind rivets are employed in the provisional holding, the provisional holding is able be performed from a single side out of the center pillar 16 side or the framework member (rocker 12, roof rail 14) side. The efficiency of a provisional holding operation may thereby be improved. Further, employing the bolts and weld nuts as fastening members enables a join state of the center pillar 16 to be well-maintained using a simple structure.

Moreover, in the exemplary embodiment, as illustrated in FIG. 5, the bracket 58 is attached to the second inner upright wall 12D on the vehicle width direction inner side of the rocker 12, and the lower end of the pillar inner panel 30 of the center pillar 16 is joined to the bracket 58. Since the position where the pillar inner panel 30 and the bracket 58 are joined is set at the vehicle upper side of the door opening flange 12F, interference between fastening members such as bolts and weld nuts and the door opening flange 12F is able to be suppressed.

Moreover, in the exemplary embodiment, since the center pillar 16 is able to be assembled to the roof rail 14 and the rocker 12 in a state in which the retractor 73 is disposed between the pillar outer panel 32 and the pillar inner panel 30, it is not necessary to form a hole or the like in the pillar inner panel 30 for installing the retractor 73 at a later stage. The vehicle width direction inner side of the retractor 73 may thus be covered by the pillar inner panel 30, enabling the rigidity of the center pillar 16 to be improved compared to structures formed with a hole for installing the retractor 73 at a later stage.

Explanation has been given regarding a vehicle side section structure according to an exemplary embodiment. However, various other configurations may of course be implemented within a range not departing from the spirit of the present disclosure. For example, although blind rivets are employed as provisional holding members in the exemplary embodiment, there is no limitation thereto, and other provisional holding members, such as clips, may be employed.

Further, although bolts and weld nuts were employed as fastening members in the exemplary embodiment, there is no limitation thereto. For example, a method may be adopted in which threaded grooves may be formed in one of the members to be joined, and bolts are screwed into and fastened to these threaded grooves. In such cases the weld nuts are not needed. Rivets or the like, which have greater joining strength than the blind rivets serving as provisional holding members, may also be used for joining. Hexalobular bolts, for example, which have a lower head than standard bolts, may also be used. In such cases, interference between the bolts and surrounding components may be effectively suppressed.

Further, although the rocker 12 is formed by an extrusion molded article in the exemplary embodiment, there is no limitation thereto. For example, a rocker configured from two rigid plates, namely a rocker inner panel and a rocker outer panel, may be employed. In such cases, upper and lower ends of the rocker inner panel and the rocker outer panel are generally configured with flanges, and these flanges joined so as to configure a closed cross-section structure. The flanges on the upper end would then become the door opening flange.

Further, although the center pillar 16 is given an example of a pillar in the exemplary embodiment, there is no limitation thereto. For example, a similar structure may be adopted in the front pillar 18 or a rear pillar.

What is claimed is:

1. A vehicle side section structure comprising:
    a framework member with a closed cross-section structure that is provided at a vehicle width direction outer end of a vehicle body and that extends along a vehicle front-rear direction so as to configure vehicle framework; and
    a pillar that extends in a vehicle vertical direction, at least one of an upper end or a lower end of the pillar being joined to the framework member; and
    a joining structure including a provisional holding member, a fastening member with greater joining strength than the provisional holding member, and join faces that are integrally formed at an upper end and a lower end of the pillar, the provisional holding member and the fastening member mechanically and directly joining the framework member and the join faces of the pillar.

2. The vehicle side section structure of claim 1, wherein:
    the provisional holding member comprises a blind rivet; and
    the fastening member comprises a bolt and a nut.

3. The vehicle side section structure of claim 1, wherein:
    the framework member comprises:
        a rocker including, at an upper end, a door opening flange that extends in the vehicle vertical direction so as to configure a lower edge of a door opening, a vehicle width direction outer side wall, and a vehicle width direction inner side wall; and
        a bracket that is attached to the vehicle width direction inner side wall of the rocker and that extends toward the vehicle upper side, and
    the pillar comprises a pillar outer panel and a pillar inner panel that is positioned at the vehicle width direction inner side of the pillar outer panel,
    the pillar outer panel being joined to the vehicle width direction outer side wall of the rocker,
    the pillar inner panel being joined to the bracket, and
    a position where the pillar inner panel and the bracket are joined is set at the vehicle upper side of the door opening flange.

4. The vehicle side section structure of claim 3, wherein:
    the pillar outer panel and the pillar inner panel are configured to accommodate a webbing take-up device therebetween such that a vehicle width direction inner side of the take-up device is covered by the pillar inner panel.

5. The vehicle side section structure of claim 1, wherein the join faces comprise two join faces that extend toward two different directions while following a shape of the framework member, and at least the fastening member joins the pillar to the framework member at the two join faces from the two directions.

* * * * *